(12) United States Patent
Jain et al.

(10) Patent No.: US 10,805,339 B2
(45) Date of Patent: Oct. 13, 2020

(54) METHOD TO MITIGATE TIMING BASED ATTACKS ON KEY AGREEMENT SCHEMES OVER CONTROLLER AREA NETWORK

(71) Applicant: Robert Bosch GmbH, Stuttgart (DE)

(72) Inventors: Shalabh Jain, Pittsburgh, PA (US); Qian Wang, Greenbelt, MD (US); Jorge Guajardo Merchan, Pittsburgh, PA (US)

(73) Assignee: Robert Bosch GmbH, Stuttgart (DE)

( * ) Notice: Subject to any disclaimer, the term of this patent is extended or adjusted under 35 U.S.C. 154(b) by 293 days.

(21) Appl. No.: 15/915,871

(22) Filed: Mar. 8, 2018

(65) Prior Publication Data
US 2018/0262526 A1   Sep. 13, 2018

Related U.S. Application Data

(60) Provisional application No. 62/468,680, filed on Mar. 8, 2017.

(51) Int. Cl.
*H04L 29/06* (2006.01)
*H04L 9/08* (2006.01)
(Continued)

(52) U.S. Cl.
CPC ............ *H04L 63/1441* (2013.01); *G09C 1/00* (2013.01); *H04L 9/005* (2013.01); *H04L 9/088* (2013.01);
(Continued)

(58) Field of Classification Search
CPC ..... H04L 63/1441; H04L 9/005; H04L 9/088; H04L 63/061; H04L 63/1475; H04L 2209/84; G09C 1/00
See application file for complete search history.

(56) References Cited

U.S. PATENT DOCUMENTS 9,300,510 B2 *   3/2016   You ..................... H04L 1/0071
9,832,093 B1 *   11/2017  Hsu .................... H04L 43/087
(Continued)

OTHER PUBLICATIONS

Ryo Kurachi, et al., (CaCAN—Centralized Authentication System in CAN (Controller Area Network), https://www.researchgate.net/publication/320083914 , Nov. 2014, hereinafter Kurachi).*
(Continued)

*Primary Examiner* — Farid Homayounmehr
*Assistant Examiner* — Raied A Salman
(74) *Attorney, Agent, or Firm* — Maginot, Moore & Beck LLP (57) ABSTRACT

A method of operating at least one node in a communication network that uses a shared communication medium has been developed to reduce or eliminate timing side-channel attacks performed by an adversary that is connected to the shared communication medium. The method includes generating, with a controller in a first node, a first jitter time offset randomly generated from within a predetermined time range, and transmitting, with a transceiver in the first node, a first data bit through an output of the transceiver that is connected to a shared communication medium, the first data bit being transmitted at a first time corresponding to the first jitter time offset added to a first predetermined transmission time.

9 Claims, 8 Drawing Sheets

(51) Int. Cl.
*H04L 9/00* (2006.01)
*G09C 1/00* (2006.01)

(52) U.S. Cl.
CPC ........ *H04L 63/061* (2013.01); *H04L 63/1475* (2013.01); *H04L 2209/84* (2013.01)

(56) References Cited

U.S. PATENT DOCUMENTS

| | | | | |
|---|---|---|---|---|
| 10,244,427 | B2* | 3/2019 | Lee | H04W 28/0289 |
| 2002/0131379 | A1* | 9/2002 | Lee | H04W 56/001 370/333 |
| 2003/0084336 | A1* | 5/2003 | Anderson | G06F 7/00 726/36 |
| 2004/0015894 | A1* | 1/2004 | Lange | G06K 9/0051 717/138 |
| 2004/0143747 | A1* | 7/2004 | Eckstein | G06F 21/755 713/189 |
| 2009/0137211 | A1* | 5/2009 | Stengel | H03L 7/087 455/76 |
| 2011/0040859 | A1* | 2/2011 | Tazzari | H04L 29/1232 709/222 |
| 2012/0075596 | A1* | 3/2012 | Hannah | H05B 47/175 353/85 |
| 2012/0083902 | A1* | 4/2012 | Daum | H04B 3/548 700/3 |
| 2012/0207080 | A1* | 8/2012 | Chang | H04W 56/002 370/315 |
| 2014/0013425 | A1 | 1/2014 | Samson | |
| 2014/0056388 | A1* | 2/2014 | Mori | H04B 1/10 375/340 |
| 2015/0033016 | A1* | 1/2015 | Thornton | H04L 63/061 713/171 |
| 2016/0381685 | A1* | 12/2016 | Kasher | H04L 27/2686 370/329 |
| 2017/0013503 | A1* | 1/2017 | Lee | H04W 28/0289 |
| 2017/0019382 | A1* | 1/2017 | Jain | H04L 12/40 |
| 2018/0189483 | A1* | 7/2018 | Litichever | G06F 21/85 |
| 2019/0115828 | A1* | 4/2019 | Liu | G09G 3/32 |
| 2019/0171595 | A1* | 6/2019 | Mishra | G06F 13/4291 |

OTHER PUBLICATIONS (Copperhilltech, A Brief Introduction to Controller Area Network, https://copperhilltech.com/a-brief-introduction-to-controller-area-network/, Oct. 14, 2015, hereinafter Copperhilltech).*
Samuel Woo, et al., A Practical Wireless Attack on the Connected Car and Security Protocol for In-Vehicle CAN, Apr. 2015, IEEE Transactions on Intelligent Transportation Systems ( vol. 16 , Issue: 2 , Apr. 2015 ), pp. 1-14.*
T. Nolte, et al., (Minimizing CAN response-time jitter by message manipulation, Proceedings. Eighth IEEE Real-Time and Embedded Technology and Applications Symposium, 2002, hereinafter Nolte).*
Fan Yao, et al., Covert Timing Channels Exploiting Non-Uniform Memory Access based Architectures, GLSVLSI '17: Proceedings of the on Great Lakes Symposium on VLSI 2017, May 2017, pp. 155-160.*
International Search Report and Written Opinion corresponding to International Application No. PCT/US2018/021587, dated Jun. 21, 2018 (9 pages).
Aciiçmez, Onur et al., "Predicting Secret Keys Via Branch Prediction," Springer Berlin Heidelberg, LNCS 4377, pp. 225-242, 2007 (18 pages).
Bernstein, Daniel J., "Cache-timing Attacks on AES," Apr. 2005 (37 pages).
Brumley, David et al., "Remote Timing Attacks are Practical," Proceedings of the 12th Conference on USENIX Security Symposium vol. 12, SSYM'03. USENIX Association, 2003.
Jain, Shalabh et al., "Physical Layer for Group Key Agreement for Automotive Controller Area Networks," In Proc. of Cryptographic Hardware and Embedded Systems (CHES 2016). Springer Berlin Heidelberg, 2016 (20 pages).
Kocher, Paul et al., "Differential Power Analysis," CRYPTO'99, LNCS 1666, pp. 388-397, 1999 (10 pages).
Kocher, Paul C., Timing Attacks on Implementations if Diffie-Hellman, RSA, DSS, and Other Systems, CRYPT0 96, LNCS 1109, pp. 104-113, 1996 (10 pages).
Microchip, Datasheet MCP2551, Technical Report, Microchip, retrieved from Internet: http://ww1.microchip.com/downloads/en/DeviceDoc/20001667G.pdf, accessed Nov. 11, 2016 (26 pages).
Müller, Andreas et al., "Plug-and-Secure Communication for CAN," CAN Newsletter, pp. 10-14, Dec. 2015 (5 pages).
Murvay, P.S. et al., "Source Identification Using Signal Characteristics in Controller Area Networks," IEEE Signal Processing Letters, vol. 21, Issue 4, pp. 395-399, Apr. 2014 (5 pages).
Cortes, C. et al., "Support-Vector Networks," Machine Learning, vol. 20, No. 3, pp. 273-297, 1995 (25 pages).
Hochreiter, Sepp et al., "Long Short-Term Memory," Neural Computation, vol. 9, No. 8, 1997 (32 pages).
Krizhevsky, Alex et al., "ImageNet Classification with Deep Convolutional Neural Networks," Neural Information Processing Systems, 2012 (9 pages).
Kruskal, Joseph B., "On the Shortest Spanning Subtree of a Graph and the Traveling Salesman Problem," Proceedings of the American Mathematical Society, vol. 7, No. 1, pp. 48-50, 1956 (3 pages).
Pettie, Seth et al., "An Optimal Minimum Spanning Tree Algorithm," Journal of the ACM, vol. 49, No. 1, 2002, pp. 16-34 (19 pages).
Prim, R.C., "Shortest Connection Networks and Some Generalizations," The Bell System Technical Journal, vol. 36, No. 6, pp. 1389-1401, 1957 (13 pages).
Sak, H. et al., "Long Short-Term Memory Recurrent Neural Network Architectures for Large Scale Acoustic Modeling," In Proceedings of Interspeech, pp. 338-342, 2014 (5 pages).
Simonyan, K. et al., "Very Deep Convolutional Networks for Large-Scale Image Recognition," Cornell University Library, submitted Sep. 2014, updated Apr. 2015, arXiv:1409.1556v6, retrieved from internet: https://arxiv.org/abs/1409.1556 (14 pages).

* cited by examiner

METHOD TO MITIGATE TIMING BASED ATTACKS ON KEY AGREEMENT SCHEMES OVER CONTROLLER AREA NETWORK

CLAIM OF PRIORITY

This application claims the benefit of U.S. Provisional Application No. 62/468,680, which is entitled "Methods to Mitigate Timing Based Attacks on Key Agreement Schemes over Controller Area Network," and was filed on Mar. 8, 2017, the entire contents of which are expressly incorporated herein by reference.

FIELD

This disclosure relates generally to the field of network communications and, more specifically, to systems and methods for secure communication using shared communication media.

BACKGROUND

The Controller Area Network (CAN) bus communications standard provides a robust communication interface that is used in a wide range of applications including, but not limited to, automobiles and other transportation vehicles, building automation, industrial systems, robotics, and other fields that require communication between embedded digital devices using a shared communication medium. Many CAN bus embodiments employ two electrically conductive wires, which are referred to as CAN-High (CANH) and CAN-Low (CANL), and electronic devices, which are referred to as "nodes" use the CANH and CANL wires as a shared communication medium to transmit and receive data using a standardized data frame format. The CAN bus typically utilizes of a pair of shielded or unshielded twisted pair of cables as the physical medium for signal transmission.

During normal operation, the nodes perform a bus arbitration process when one or more nodes wish to transmit a data frame to ensure that only one node actually transmits data on the CAN-High and CAN-Low lines at a time to provide reliable communication without "collisions" that occur when two or more nodes transmit simultaneously. In the CAN bus standard, when transmitting the dominant bit '0' on the bus, the output pins CANH and CANL are driven to different voltage levels, and the difference from CANH to CANL is the output of the CAN bus. Similarly, transmission of a recessive bit '1' occurs when CANH and CANL are not driven and will have similar voltage levels. Because the CAN bus is a shared communication medium, every node that is connected to a CAN bus can read each bit of data that is transmitted through the bus. This property of CAN bus presents problems when two nodes wish to communicate data privately that cannot be understood by other nodes that are connected to the bus.

Recent advancements to CAN bus implementations include configurations in which two nodes that are connected to the CAN bus transmit bits of data simultaneously (to produce a collision intentionally) to exchange cryptographic key data in a manner that prevents third party nodes from being able to determine which of the two transmitting nodes is actually transmitting information that forms a part of the cryptographic key. In one part of these key exchange techniques, two nodes simultaneously transmit a logical 1 and a logical 0 signal, followed by simultaneous transmission of the logical complement of the original bits from both nodes, which produces a summed voltage differential between the CANH and CANL wires that can be detected by each of the attached nodes. However, while all of the devices that are attached to the CAN bus can detect the transmission of a dominant bit (logical 0) through the CAN bus, because the two nodes transmit simultaneously the other nodes that are connected to the CAN bus cannot determine which of the two nodes is transmitting the dominant 0 or the non-dominant 1 at any one time during the transmission sequence of the 0/1 bit followed by the logical complement, and only the two transmitting nodes do know which bit is being transmitted. The two nodes transmit the logical 0 and 1 bits and their logical complements in a randomized manner (if both nodes transmit a logical 00/11 sequence or logical 11/00 sequence then the transmission is ignored since those signals do enable third parties to determine the data transmitted from each node), which prevents other nodes connected to the CAN bus from detecting the identity of the node that transmits each bit. This operation, which is repeated many times and combined with other techniques that are not described in greater detail herein, forms the foundation to enable two nodes—and indirectly even larger groups of nodes—to exchange data that form the basis for shared cryptographic keys. After the nodes have exchanged cryptographic keys, those shared keys are used to perform data encryption and authentication/verification operations using techniques that are otherwise known to the art that enable different subsets of the nodes on the bus to exchange data that cannot be decrypted or altered in an undetectable manner by other nodes that are connected to the CAN bus.

As described above, nodes that are connected to the CAN bus with standard CAN bus transceivers can detect the voltage signals corresponding to logical 0 and 1 levels through the CANH and CANL wires of the CAN bus. When two nodes transmit a logical 0 and 1 simultaneously, the transceivers of most standard CAN nodes cannot determine which of the two nodes transmitted the logical 0 and 1. However, at a physical level the electrical signals that are transmitted through the CAN bus do not perfectly correspond to the logical 0 and 1 levels of digital logic that are described above because the physical components of the CAN bus and the nodes themselves have complex and different analog electrical properties. In some instances, an adversary, which is either a legitimate hardware node in the CAN bus that has been compromised by malicious software or an unauthorized hardware device that is electrically connected to the CAN bus, performs high-precision measurements of the properties of the electrical signals that are transmitted through the CAN bus in a manner that may enable the adversary to determine which node transmits the logical 0 and which node transmits the logical 1 signal in the process that is described above. In particular, since both nodes transmit a logical 0 and logical 1 in the randomized order for each bit exchange, the adversary can monitor signal characteristics of the dominant bit signal (the logical 0) that is transmitted from each node. The adversary can then reconstruct the secret data that is shared between the two nodes and compromise the security of the CAN bus system. This class of attacks is referred to as a side-channel attack because the adversary extracts information based on precise electrical signal measurements that are affected by the physical properties of the bus and the nodes that are connected to the bus in a particular CAN bus system even though the adversary has not defeated the logical protocol for cryptographic key exchange that is described above.

Figure 1:
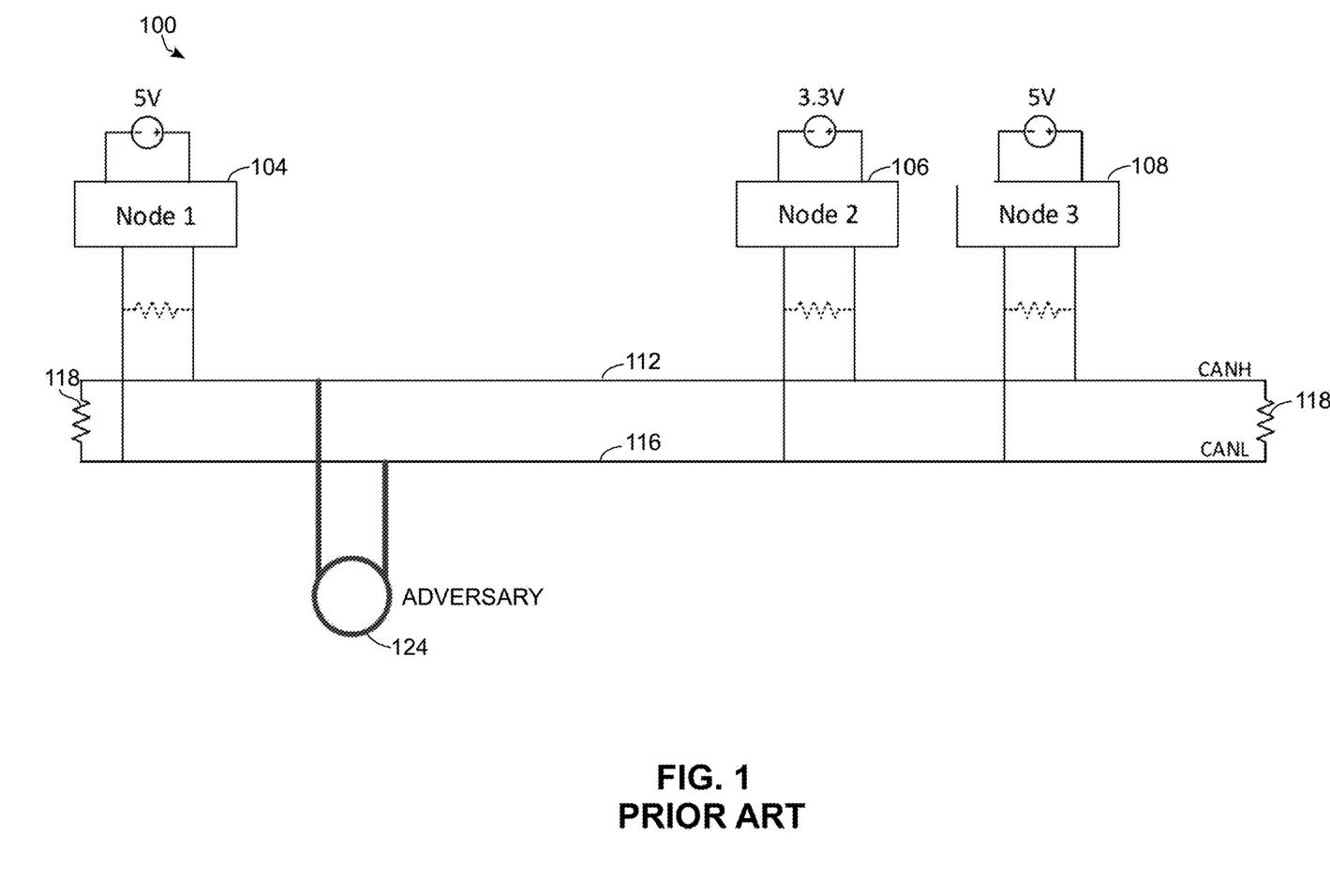
FIG. 1 is a diagram of a prior-art CAN bus system in which an adversary node measures electrical signals in the CAN bus to perform side-channel attacks.

FIG. 1 depicts an example of a prior art CAN network 100 that includes three CAN nodes 104, 106, and 108 that are each connected to a CANH conductor 112 and CANL conductor 116 that are terminated by resistors 118 to form a CAN bus. The adversary node 124 is also electrically connected to the CAN bus and the adversary node includes electrical signal measurement and signal processing hardware that enables the adversary to perform one or more side-channel attacks. As described above, side-channel attacks present challenges to maintaining security in shared medium communication networks such as CAN bus. Consequently, improvements to methods and systems that reduce or eliminate the threats from these side-channel attacks would be beneficial.

SUMMARY

The embodiments described herein include countermeasures to secure a CAN bus or other network that uses a shared communication medium from adversaries that can physically probe the shared communication medium. The proposed techniques enable obfuscation of the transition times for signals that are observed by an adversary. The advantages of the proposed embodiments include, but are not limited to, embodiments to protect systems in which two nodes transmit data bits simultaneously from timing side-channel attacks. The embodiments utilize a variety of techniques such as variation of bit timing by introducing jitter or cooperative schemes that utilize multiple transmitters.

In one embodiment, a method for operation of at least one node in a communication network has been developed. The method includes generating, with a controller in a first node, a first jitter time offset randomly generated from within a predetermined time range, and transmitting, with a transceiver in the first node, a first data bit through an output of the transceiver that is connected to a shared communication medium, the first data bit being transmitted at a first time corresponding to the first jitter time offset added to a first predetermined transmission time.

DETAILED DESCRIPTION

For the purposes of promoting an understanding of the principles of the embodiments disclosed herein, reference is now be made to the drawings and descriptions in the following written specification. No limitation to the scope of the subject matter is intended by the references. This disclosure also includes any alterations and modifications to the illustrated embodiments and includes further applications of the principles of the disclosed embodiments as would normally occur to one skilled in the art to which this disclosure pertains.

As used herein, the term "bit" refers to a binary value that can have one of two discrete values, which are typically represented as a "0" or "1" in text. Communication systems generate signals with different voltage levels, phases, or other signal characteristics that represent the two values of a binary bit during transmission of data. As is well-known to the art, digital data includes a series of one or more bits that can represent numbers, letters, or any other form of data and, in particular, a set of bits can form a cryptographic key. As used herein, the terms "logical complement" or "inverse" as applied to binary values are interchangeable and refer to a set of data or an operation that changes the values of each bit of binary data (e.g. the binary sequence "101" is the logical complement of "010"). As described in more detail below, a protocol for secure key exchange leaves different nodes with sets of corresponding bits for shared keys that are logical complements of each other. Selected sets of the nodes perform an inversion operation so that all of the nodes have the same shared key.

As used herein, the term "key" or "cryptographic key" refers to a sequence of bits that two or more nodes in a communication network use to perform cryptographic operations including the encryption and decryption of data and for authentication of transmitted data. A "shared key" refers to a key that is known to two or more nodes that communicate with each other but the shared key is not otherwise known to third parties, including adversaries. The methods and systems described herein enable two or more nodes in a communication network to generate a shared key that an adversary cannot identify even if the adversary can monitor any communication that occurs between the nodes and is capable of performing the side-channel attacks that are described herein. After the shared keys are generated, the nodes perform cryptographic operations that are otherwise well-known to the art and are not described in greater detail herein.

As used herein, the term "shared communication medium" refers to a physical network connection and network communication protocol in which multiple nodes transmit and receive data in a manner where any transmission from a single node is received by all other nodes that are connected to the shared communication medium. In a shared communication medium, two or more nodes can transmit data simultaneously. The shared communication medium is considered an "insecure" or "untrusted" communication channel because an adversary is assumed to have the ability to monitor any and all communications that occur through the shared communication medium.

Two non-limiting examples of shared communication media include the Controller Area Network bus (CAN bus) network communication bus and protocol and the $I^2C$ bus. In both of these embodiments, all nodes that are communicatively connected to the shared communication medium can observe all signals that are transmitted through the communication medium, including signals that are not intended for receipt by a particular node. As described in more detail below, each node is a computing device that includes a transceiver configured to both transmit and receive signals through the shared communication medium to one or more additional nodes.

One class of side-channel attack is referred to in this document as a "timing side-channel" attack that relies on precise measurements of the observed times of signals from different nodes in a CAN bus system to determine which node is transmitting a logical 0 or 1 when two nodes transmit 0 and 1 bits data simultaneously followed by the logical complements of the transmitted bits using the techniques described above. An adversary that is capable of observing the variation of CAN bus signals with sufficiently high voltage precision and timing resolution performs the timing side-channel attack to differentiate between the transmitter of the logical 0 and 1 signals in an unprotected system such as the prior-art CAN bus of FIG. 1. In particular, the adversary can precisely time the arrival of the leading edge of the dominant bit logical 0 signals from the nodes, which also include time gaps between the dominant signals or "glitches" where small portions of the dominant bits or recessive bits from both nodes overlap in time and are observed simultaneously, since both nodes transmit a logical 0 and logical 1 in either first transmission or the second transmission described above. Such an adversary can be simply realized by an eavesdropper who accesses the wires directly using a high precision oscilloscope (digital or analog). An alternate means could be through an regular node connected to the CAN bus with a high precision analog-to-digital (A/D) converter at the input with a modified CAN controller capable of sampling the bus at a high frequency. For example, in automotive scenarios (or general systems), such nodes can be connected to the OBD-II port (diagnostics port).

The CAN bus system uses differential voltage for signals in which two nodes that transmit a logical 0 (high voltage) and logical 1 (low voltage) simultaneously, only one of the nodes produces a change in the voltage differential on the CANH and CANL conductors. In most CAN embodiments, both the CANH and CANL conductors are driven to a predetermined voltage level (e.g. 2.5V) by default and if the difference between the voltages on CANH and CANL is zero or within a predetermined operational threshold of zero then a transmissions is said to be "recessive", which corresponds to a logical 1 and the nodes connected to the CAN Bus detect the logical 1 based on the zero or low voltage differential. If, however, a node transmits a logical 0 then the node drives the CANH conductor to a higher voltage level above 2.5V and the CANL wire to a lower voltage level below 2.5V. The difference in voltage between the CANH and CANL conductors is easily detected by other nodes that are connected to the CAN bus to detect the logical 1 and 0 signals. Typical propagation delay for the twisted pair cable used as the physical medium for the CAN bus is 5 ns/m. Thus for a traditional network of length up to 50 m, the difference in the time an observer observes a signal transition and the transmitter drives (or releases) the bus can be up to 250 ns. Though such delays are accommodated within the CAN bit timing specification for correct sampling of the bit value, an adversary can exploit the time differences to identify the transmitters when two transmitters operate simultaneously.

When two perfectly synchronized nodes transmit a logical 0 and logical 1 bit simultaneously followed by the logical complement of a logical 1 and logical 0 bit as part of the cryptographic key exchange process described above, the transmitted signals would arrive at an eavesdropper located at any point on the bus (except perfectly centered with respect to the nodes), at different times due to the signal propagation delay through the conductors of the CAN bus. This is simply due to the difference in propagation delay of the signal from the two nodes, in which signals travel at a fraction of the speed of light, to an adversary node that is located at a larger distance from one node relative to another node on the bus and can observe differences in the arrival times of the two signals.

Figure 2A:
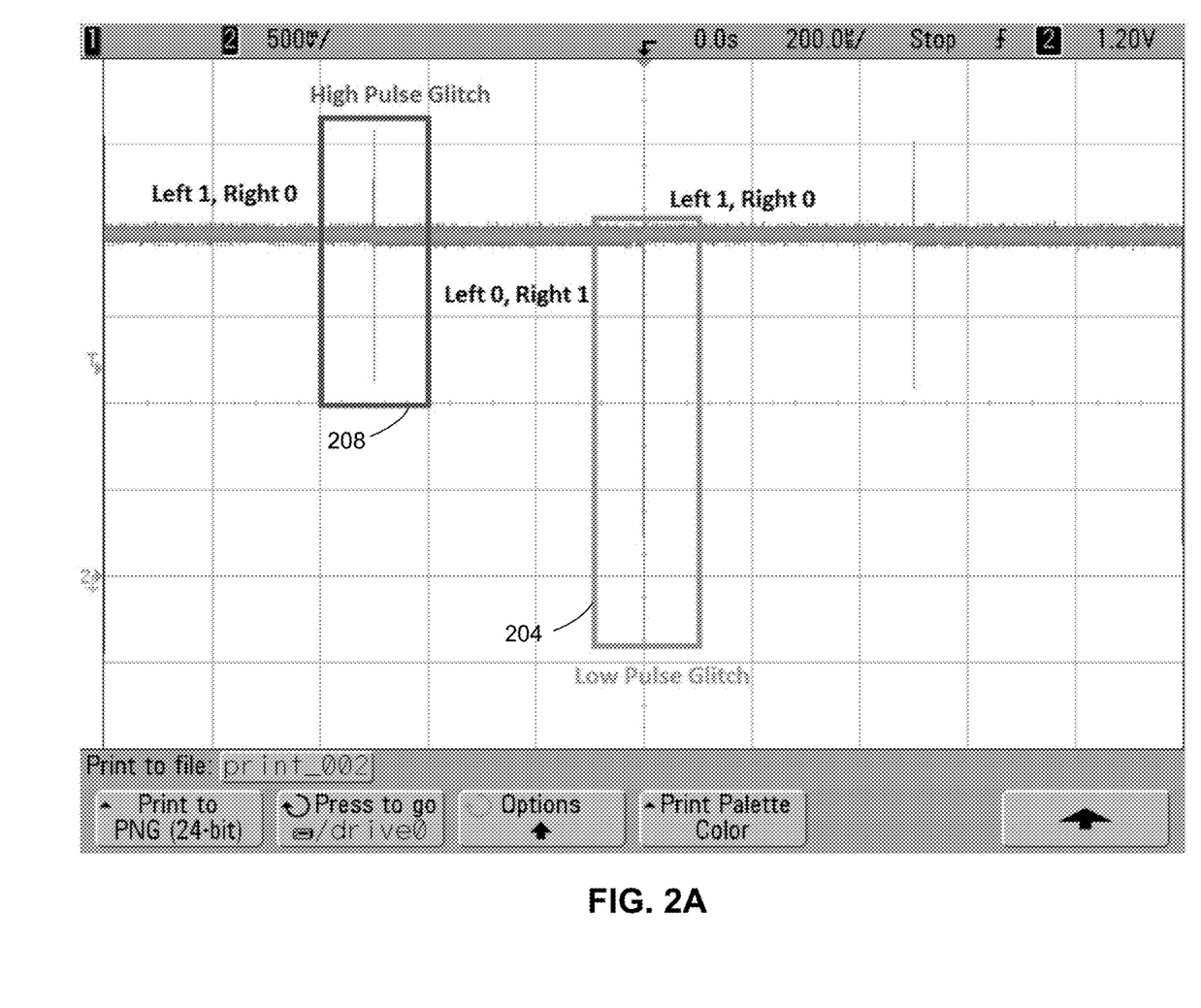
FIG. 2A is a signal plot depicting time differences in high and low signal pulses detected from two different nodes that transmit simultaneously in a CAN bus.

FIG. 2A depicts a signal plot of observations for an adversary that is symmetrically places relative to two identical transmitters. However, as it can be seen, even a minor propagation difference of 0.02% of the bit timing is sufficient to distinguish between the dominant transmission from the left node (204) and the right node (208), which enables the adversary to determine which of the two nodes transmitted the logical 0 and 1 signals.

Figure 2B:
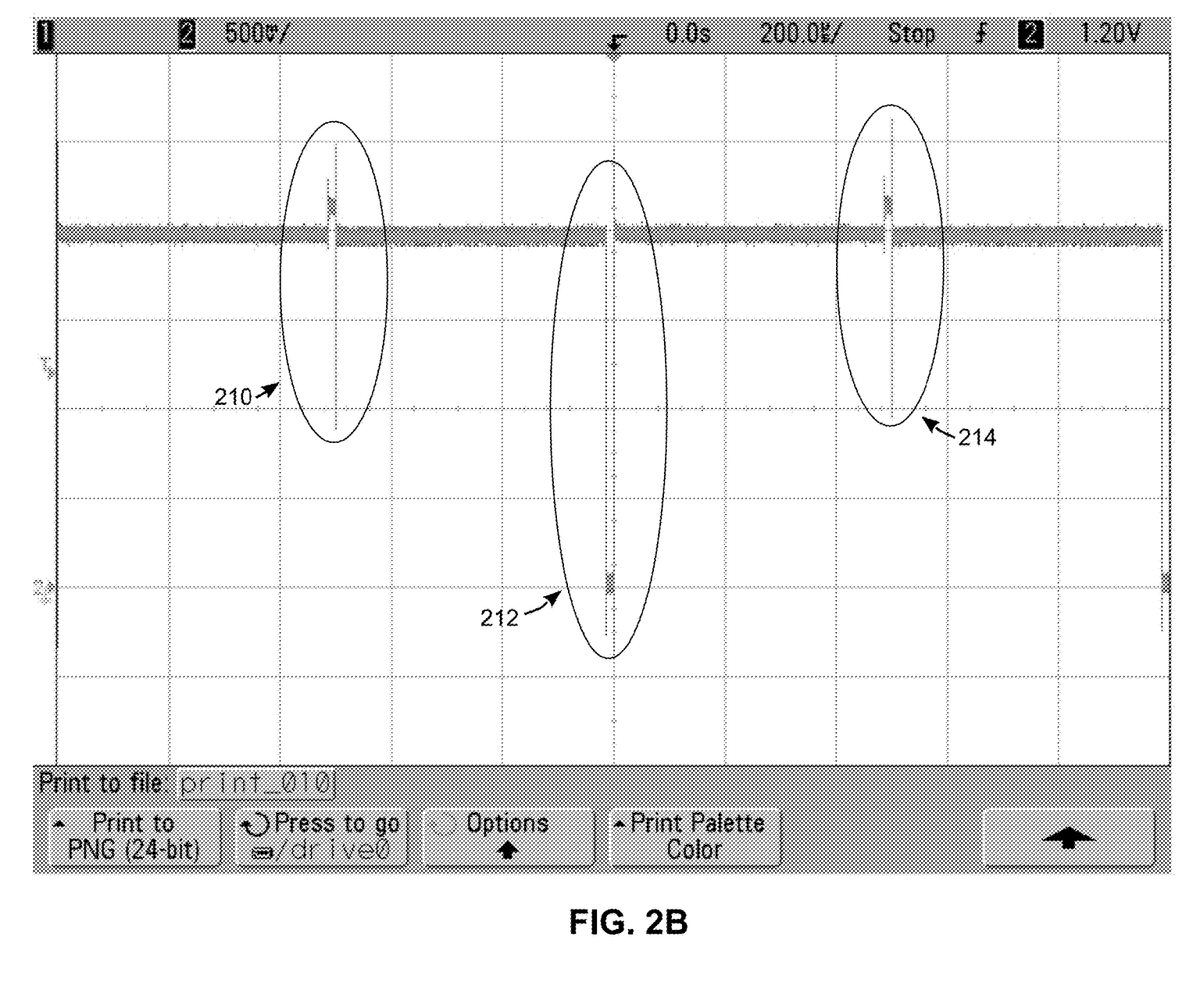
FIG. 2B is another signal plot depicting time differences from two different nodes that transmit simultaneously in a CAN bus.

As the difference in the propagation delay from the two nodes becomes increasingly mismatched, an adversary can identify the bits more easily. FIG. 2B is another signal plot the scenario when the propagation difference is approximately 1% of the bit timing due to propagation delay, small errors in the synchronization of the nodes, or both. FIG. 2B denotes the signal observed by the adversary for 3 successive bit interactions between two nodes, with the nodes transmitting, 0-1, 1-0 and 0-1. The glitches 210, 212 and 214 denote the bit transition points. The high glitch, 210, occurs due to both nodes transmitting a dominant value. This indicates that the faster node transitioned from a recessive to a dominant value at that time, while the slower node held a dominant value. Similarly, the glitch in 212 occurs because both nodes transmit a recessive value, indicating that the faster node transitions to a recessive state while the slower node held the recessive state. While FIG. 2A and FIG. 2B depict situations in which the nodes are precisely synchronized, in a typical CAN network, the transmitting nodes are not precisely synchronized. During the cryptographic key exchange process, the two nodes that transmit simultaneously are synchronized to one node that initiates the cryptographic key exchange protocol, which might be one of the two nodes involved in the cryptographic key exchange or another node in the CAN system that is referred to as the gateway node. Consequently, for practical scenarios, the mismatch between the transitions observed by an adversary would be far greater than the examples that are depicted in FIG. 2A and FIG. 2B, and the adversary can identify the nodes that transmit the data with high probability.

Figure 2C:
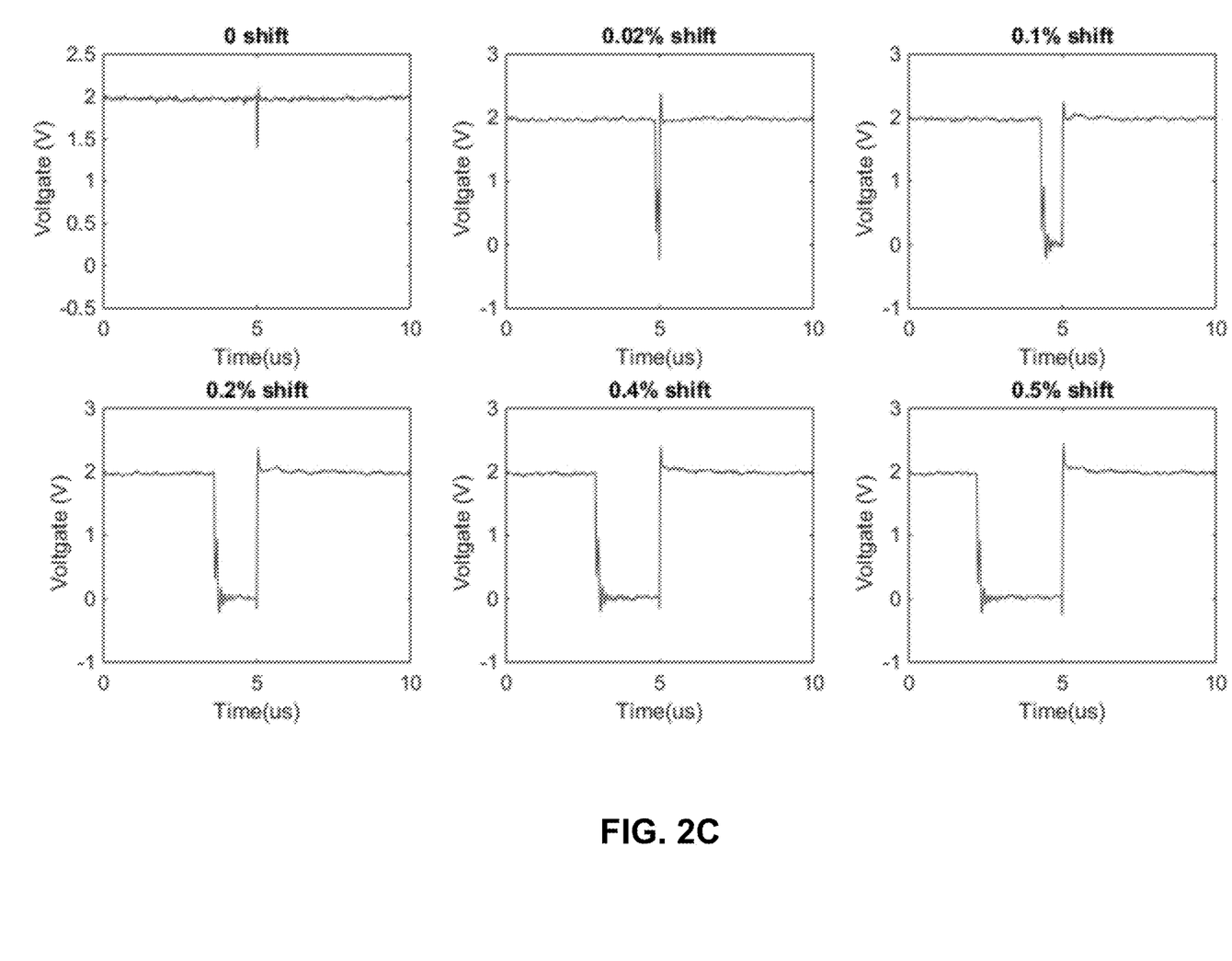
FIG. 2C is a set of signal plots that are generated as an observer detects signals generated by two different nodes while observing the signals at different locations in a CAN bus.
Figure 2D:
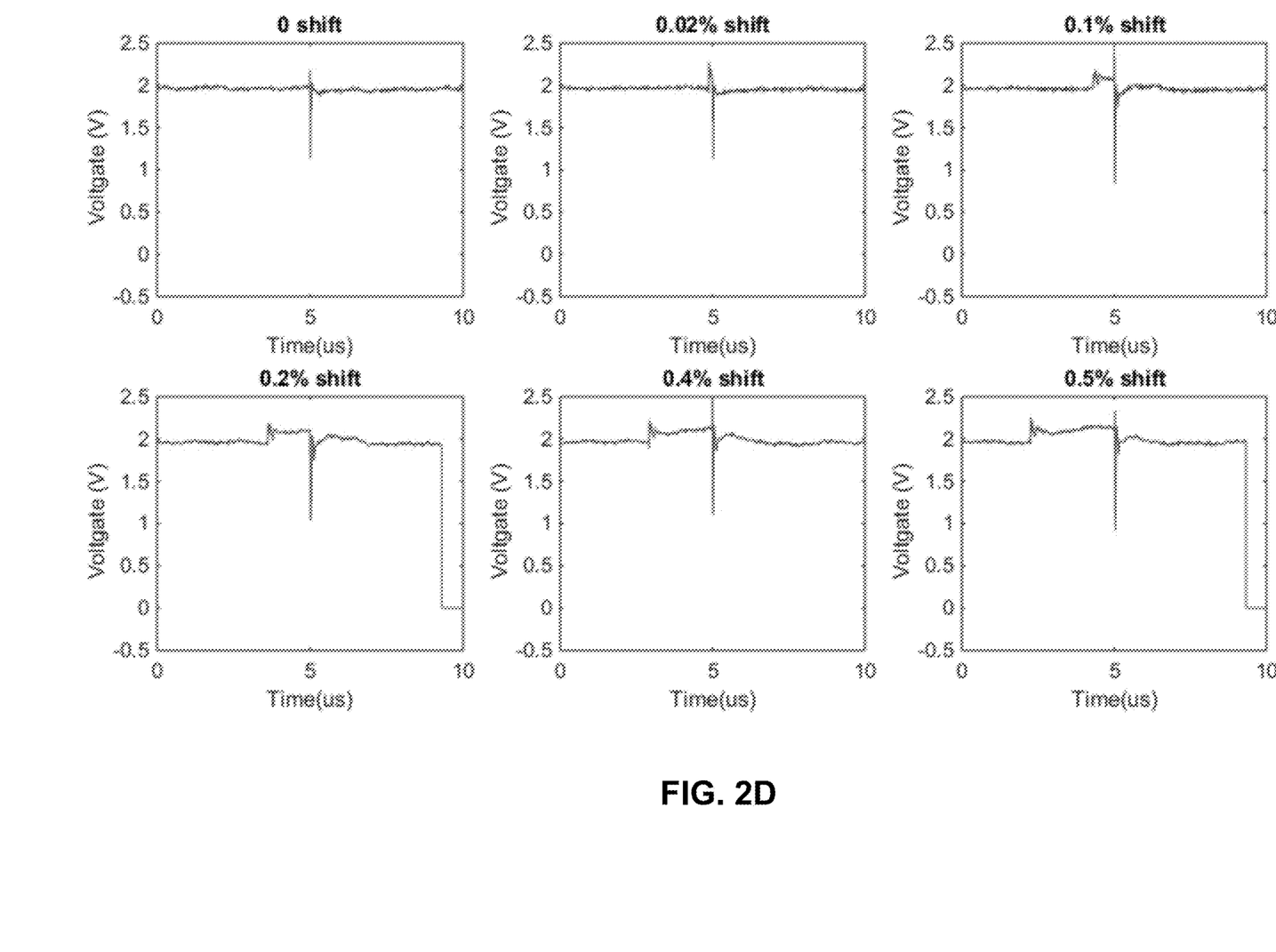
FIG. 2D is another set of signal plots that are generated as an observer detects signals generated by two different nodes while observing the signals at different locations in a CAN bus.

FIG. 2A and FIG. 2B illustrate timing signals that enable an adversary that is located in a fixed position in the CAN bus to perform timing side-channel attacks. Additionally, in some scenarios the adversary can be connected to the CAN bus at multiple locations. For example, in the prior art CAN-bus configuration of FIG. 1, the node 104 initially transmits a dominant bit and node 106 simultaneously transmits a recessive bit. In the next transmission, the nodes 104 and 106 switch and the node 106 transmits the dominant bit while the node 104 simultaneously transmits the recessive bit. FIG. 2C depicts observations from an adversary that moves closer to node 104, and the propagation delay from the node 104 reduces. Similarly, in FIG. 2D, illustrate the scenario where the adversary moves closer to node 106. In most practical scenarios the adversary node does not actually move to a different location in the CAN bus within the time period of a single sequence of bit transmissions. Instead, the movement depicted in FIG. 2C and FIG. 2D usually depicts situations in which different pairs of nodes in a CAN bus network that are located at different positions relative to the adversary node transmit data bits, where the operation of different pairs of nodes effectively moves the position of the adversary even though the adversary often remains connected to the CAN bus at a single physical location. It can be seen that based on the resolution and capabilities of an adversary, even with the capability of making only minor changes to its location, the adversary can adjust the position on the can position itself to easily distinguish between the transmitting nodes.

The timing side-channel attacks can be effective in determining which node transmits a bit of data when two nodes transmit data simultaneously even when the nodes use similar or identical hardware configurations that make other side-channel attacks, such as voltage level detection side-channel attacks, difficult to perform. In particular, the timing side-channel attacks rely on precise detection of the time of arrival at the location of the adversary node of different signals from nodes that are connected to the CAN bus, and the timing side-channel attacks do not require the adversary to rely on small differences in the voltage levels in the signals that are transmitted from different nodes.

Introduction of Timing Jitter

As described above, an adversary node can utilize a timing side-channel attack to detect the identity of the CAN bus node that transmits each signal when two CAN Bus nodes operate simultaneously. One technique to reduce or eliminate this information leakage is to introduce jitter into the timing of transmissions from the two nodes that send data to reduce or eliminate the opportunity for the adversary to identify the nodes based on precise time measurements of the transmitted signals. As is known to the art, jitter s the deviation from true periodicity of a presumably periodic signal. While CAN bus systems do not use a global clock to control periodic signal transmission, the transmitting nodes in CAN bus systems generate a sequence of bits at constant rate with expected periods of time between each transmitted bit. The presence of jitter in communication systems often occurs in an uncontrolled manner that produces errors and other problems with operation of the communication system. The embodiments described herein generate jitter in a randomized but controlled manner to reduce or eliminate the ability of the adversary node to performing timing side-channel attacks while still maintaining operation of the CAN bus system to enable two nodes to transmit data simultaneously to perform a cryptographic key exchange process.

Figure 3:
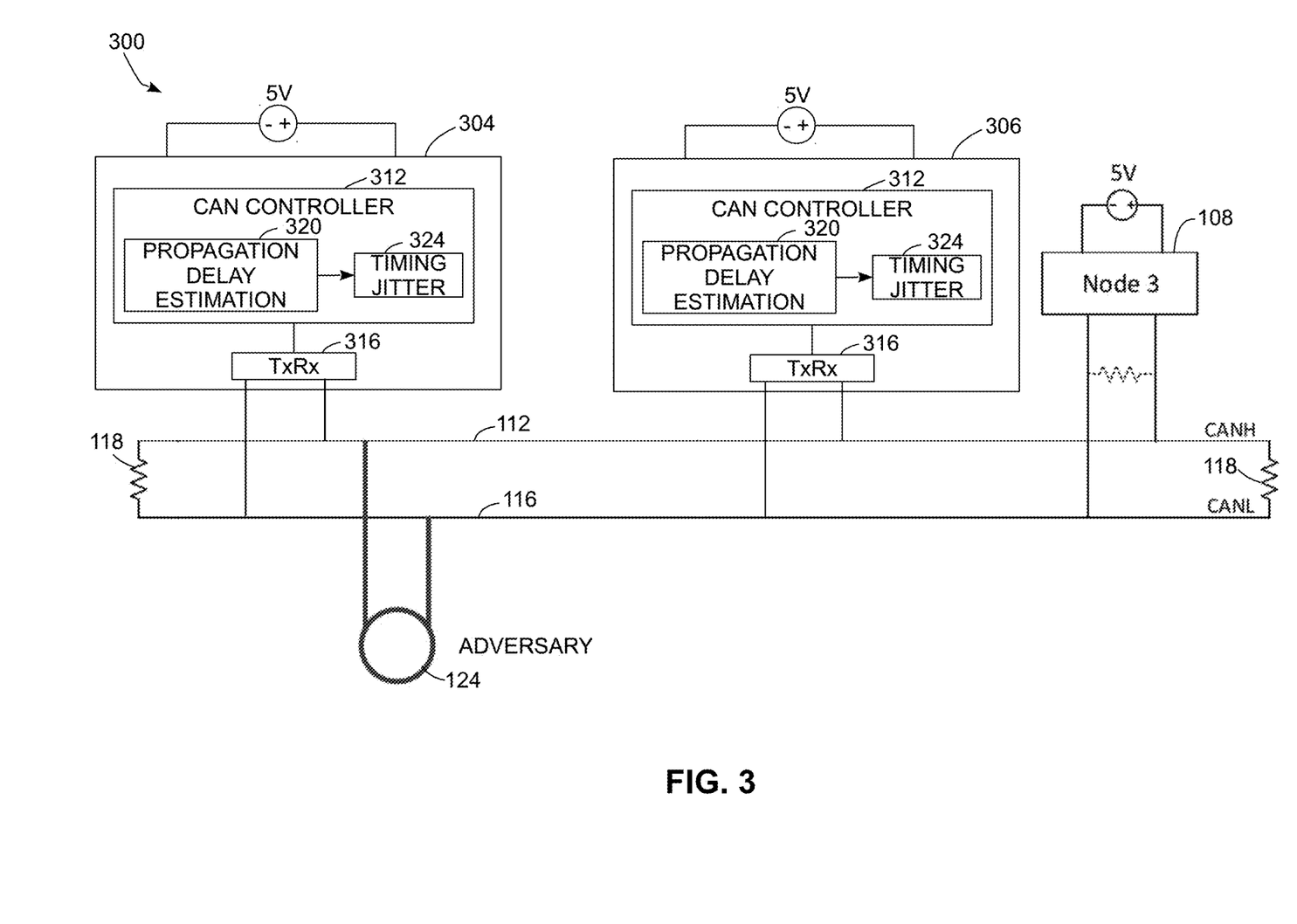
FIG. 3 is a diagram of a CAN bus system with nodes that are configured to adjust the time of transmission of bits using randomized jitter to reduce or eliminate the ability of an adversary to perform timing side-channel attacks.

FIG. 3 is a schematic diagram of a CAN bus system 300 which includes nodes 304 and 306 that are specifically configured to reduce or eliminate the ability of an adversary to perform the timing side-channel attacks that are described above. The CAN bus system 300 also includes the CANH conductor 112 and the CANL conductor 116 that are terminated by resistors 118 to form a CAN bus shared communication medium for communication between the nodes. Each of the nodes 304 and 306 includes a CAN Bus controller 312, which is typically a digital microcontroller, microprocessor, or other suitable digital logic device, and a CAN Bus transceiver 316. In FIG. 3, the adversary node 124 is connected to the CAN Bus and attempts to distinguish which of the nodes 304 or 306 transmits the logical 0 and 1 signals when the nodes 304 and 306 transmit data simultaneously to perform secure exchange of cryptographic key data. While FIG. 3 depicts two nodes 304 and 306 for illustrative purposes, other CAN bus embodiments include a larger number of nodes that are placed at different distances from each other at various locations on the CANH conductor 112 and CANL conductor 116.

In each of the nodes 304 and 306, the CAN controller 312 is operatively connected to the CAN bus transceiver 316. The transceiver 316 implements the physical layer generation of electrical signals for transmission through the CAN bus and receives data bits that are transmitted by other nodes through the CAN bus. The CAN controller 312 controls the time of operation of the transceiver and provides the command signals to control which bit (a logical 0 or 1) the transceiver 316 transmits.

The controller 312 includes hardware and software elements that implement propagation delay estimation 320. As described in further detail, the CAN controller 312 measures the round trip time that is required to communicate with another node in the CAN network prior to commencing the simultaneous bit transmission process to exchange cryptographic key data with the other node. The propagation delay estimation 320 in the controller 312 includes a high precision timer circuit, a continuously running counter, or other suitable time measurement implementation to measure the round trip time with high precision and generate an estimate of the propagation delay for signal transmission to the other node based on the round trip time. The CAN controller 312 also includes hardware and software elements that implement timing jitter 324 to adjust the precise time at which the node transmits bits of data by introducing a randomized jitter timing offset that affects the time of bit transmission. The CAN controller 312 uses, for example, a hardware or software random number generator to produce randomized jitter time offset values within an operational range that is both large enough to reduce the effectiveness of the timing side-channel attacks while being small enough to avoid introducing errors into the communication between the nodes 304 and 306 in the system 300. The range of the jitter used is based, at least in part, on the output of the propagation delay estimation 320 that varies based on the locations of different nodes in the network 300. The operation of the CAN controller 312 and the nodes 304 and 306 in the system 300 is described in further detail below.

Figure 4:
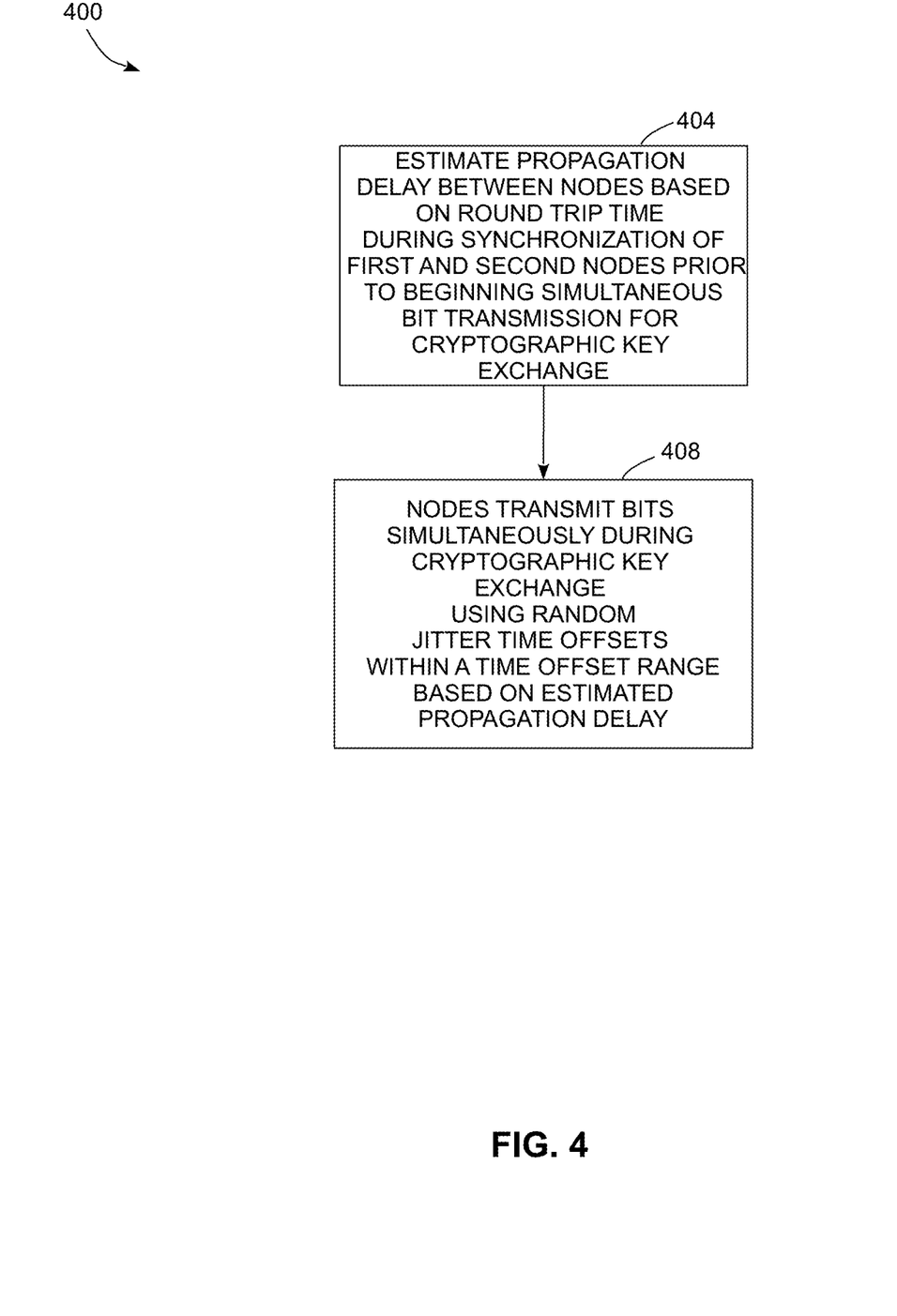
FIG. 4 is a block diagram depicting a method of operation of the system of FIG. 3 to reduce or eliminate timing side-channel attacks.

FIG. 4 depicts a process 400 for operation of nodes in a communication network to reduce or eliminate the ability of an adversary to perform timing side-channel attacks when two nodes transmit bits simultaneously to perform a cryptographic key exchange process. In the description below, a reference to the process 400 performing a function or action refers to an operation of a controller to execute instructions to perform the function or action in conjunction with other components in a communication network. The process 400 is described in conjunction with the system 300 and the nodes 304 and 306 of FIG. 3 for illustrative purposes.

During the process 400, the nodes 304 and 306 generate estimates of a propagation delay between the nodes on the CAN bus while performing a synchronization process with each other prior to transmitting bits to exchange cryptographic key data to ensure that both of the nodes 304 and 306 transmit data simultaneously (block 404). For example, the node 304 initiates the synchronization process by transmitting a first data frame that includes a standard CAN Bus header and least one bit of payload data with a dominant logical 0 level to the node 306. The node 306 responds to the first data frame with a second acknowledgement data frame. In the first node 304, the CAN controller 312 starts the timer for propagation delay estimation 320 upon transmission of the final bit of the first data frame and identifies a round trip time to the node 306 based on the time delay until the transceiver 316 initially detects the first bit of the second acknowledgement data from the node 306, where the first bit of the acknowledgement data frame is a dominant bit. The CAN controller 312 divides the observed time delay in half to generate an estimate of the one-way propagation delay $\hat{t}_{12}$, which is half of the round trip time. In some configurations, the CAN controller 312 in the first node 304 also subtracts a fixed processing delay time period corresponding to an integer multiple of the length of time taken to transmit a single bit (e.g. 1 bit period) from the round trip time based on the hardware configuration of the second node 306 to account for delays in the transmission of the acknowledgement data frame due to processing delays within the node 306. The estimated propagation delay generated above accounts for both the one-way propagation time of a signal through the CAN bus and for any imprecisions in the time synchronization between the two nodes. Note that at this point the second node 306 does not have an estimate of the propagation delay $\hat{t}_{12}$, but as described below this information is only required to be available to one node in the pair. However, the second node 306 can generate another estimate of the propagation delay $\hat{t}'_{12}$ in a configuration in which the first node 304 transmits a second acknowledgment data frame to the second node 306. The second node 306 estimates the propagation delay based on the round trip time of the first acknowledgment data frame and the second acknowledgement data frame using the same process described above. The adversary 124 can observe all of the data and the sources of the data that are transmitted during the synchronization process described above without compromising the security of the following cryptographic key exchange process.

Figure 5:
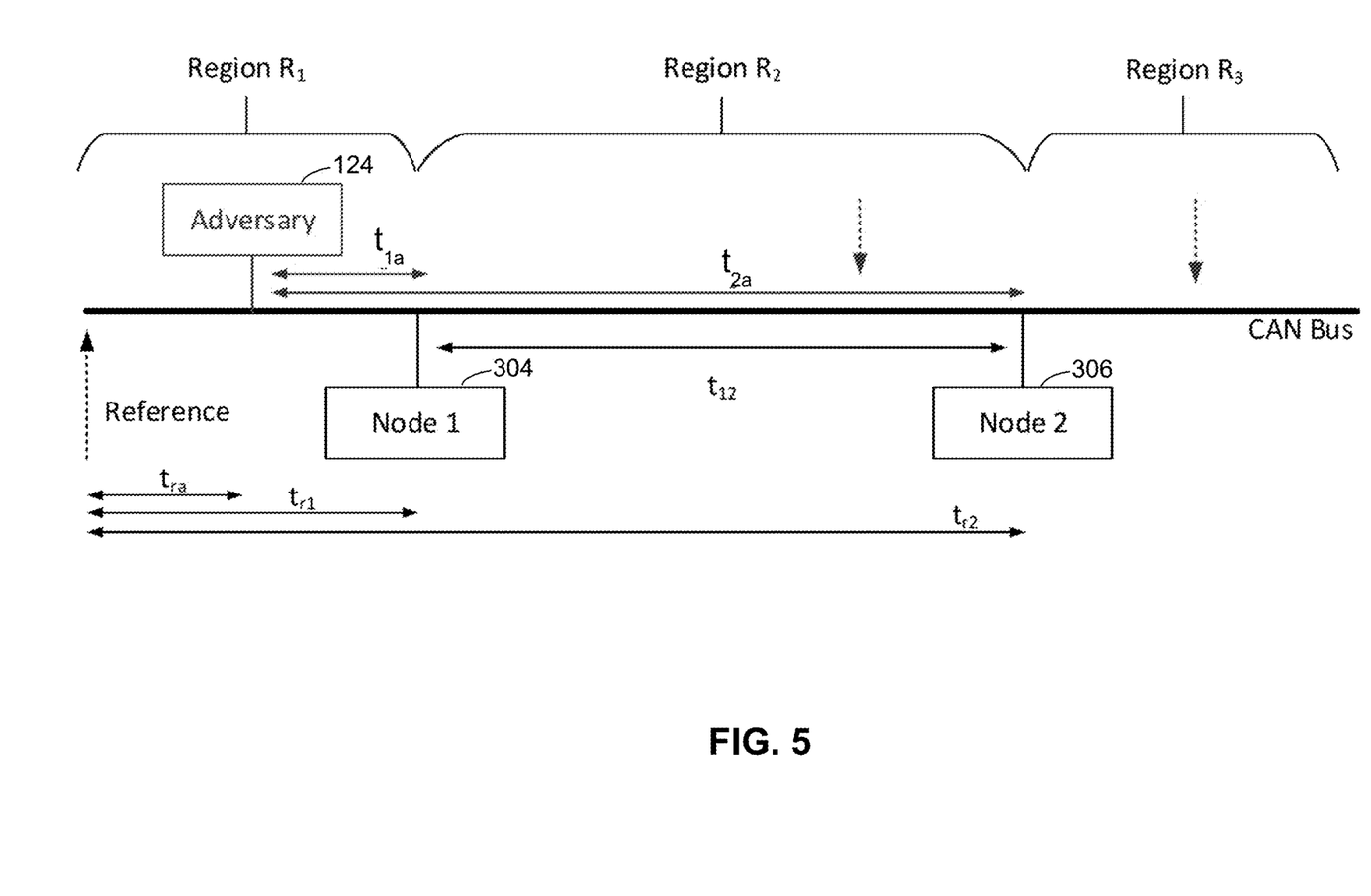
FIG. 5 is a timing diagram depicting signal timing for an adversary node that observes signals transmitted from two nodes as the adversary is connected to different regions of a CAN bus.

The estimation process for the propagation delay $\hat{t}_{12}$ described above describes synchronization between the nodes 304 and 306 directly. In other configurations a third node, which is referred to as a gateway node, in the system performs the time synchronization between both of the nodes 304 and 306. In FIG. 5, the "Reference" label corresponds to one location of the gateway node in a CAN bus, although more generally the gateway node can be placed at any available location in the CAN bus. The gateway node introduces additional variables into the propagation delay because both of the nodes 304 and 306 have a separate signal propagation time through the CAN bus to reach the gateway node, and both of the nodes 304 and 306 may further experience non-uniform synchronization errors when both nodes synchronize with the gateway node. As depicted in FIG. 5, the term $t_{r1}$ refers to the propagation delay between node 304 and the gateway node, the term $t_{r2}$ refers to the propagation delay between the node 306 and the gateway node, the term $t_{ra}$ refers to the propagation delay between the adversary node 124 and the gateway node, and the terms $t_{1a}$ and $t_{2a}$ refer to the propagation delay between the adversary 124 and the nodes 304 and 306, respectively.

In the embodiment that uses the gateway node, the estimated value $\hat{t}_{12}$ can be determined based on the following equation:

$$\hat{t}_{12} = (t_{r2} + t_{2a} + t_{p2}) - (t_{r1} + t_{1a})$$
$$= (t_{r2} - t_{r1}) + (t_{2a} - t_{1a}) + t_{p2}$$
$$= (\text{offset between nodes}) + (\textit{diff. in prop delay}) + (\textit{proc time})$$

In the equation above the term $t_{p2}$ refers to processing delay of the second node, such as node 306 in the example above. Here, $\hat{t}_{12}$ determines the ability of the adversary node 124 to differentiate between the two nodes 304 and 306. Based on the location of the adversary node 124, the delay varies from $2t_{12}+t_{p2}$ in region $R_1$ to $t_{p2}$ in region $R_3$. If the nodes utilized the jitter-intervals to determine the start times of the bits, the adversary would observe the bit transition times as samples from the two distributions, over the support sets $I_1=(t_N^l, t_N^h), I_2=(t_2^l+\hat{t}_{12}, t_2^h+\hat{t}_{12})$, for each of nodes $N_1$ and $N_2$, respectively. The leakage to the adversary is determined by its ability to distinguish between a sample from $I_1$ and $I_2$. Thus, the process 400 introduces timing jitter to increase the overlap between the two intervals of observed signals to reduce the ability of the adversary node 124 to determine that a signal actually belongs to only one of the sets $I_1$ or $I_2$, which prevents the adversary node from identifying the node that transmitted the signal.

The process 400 continues as both of the nodes transmit data bits simultaneously after completion of the synchronization process to exchange a cryptographic key using a random jitter to adjust the time of transmission for each bit to prevent data leakage of a cryptographic key to the adversary 124 via timing side-channel attacks (block 408). In the system 300, the CAN controller 312 in both of the nodes 304 and 306 uses the random number generator in the timing jitter 324 to generate a random delay value between a minimum and maximum time value that is referred to as a jitter interval $(t_N^l, t_N^h)$ for each node N. The minimum time value $t_N^l$ is 0 in some embodiments, which means that the node randomly chooses no delay in the transmission of bits, while the minimum value $t_N^l$ is a negative number in other embodiments. The negative number indicates that a node transmits a bit at an earlier time than would otherwise occur, where the negative time offset generated by the random jitter process is sufficiently small that the earlier transmission of a bit does not interfere with the transmission of the previous bit during operation of the node. Thus, the terms "delay" and "time offset" as used herein can refer both to positive delays that result in a later transmission time or negative delays that result in an earlier transmission time. The CAN controller 312 is programmed with a maximum time value $t_N^h$ is selected to be a time that corresponds to a multiple $\alpha$ of the propagation delay between the nodes $\hat{t}_{12}$, such as $\alpha\hat{t}_{12}$ where a is a predetermined value in a range of, for example, [1, 2] although other multiplier ranges may be used. Similarly, the value of $t_N^l$ can be $-\alpha\hat{t}_{12}$. The value of $t_N^h$ is generally larger than any reasonable estimated propagation delay value ($\hat{t}_{12}$) and small enough that even the largest randomly selected jitter time does not produce errors in transmitting and receiving the data bits. In the embodiment of FIG. 3, the CAN controller 312 in the nodes 304 and 306 selects jitter time offset values in the range $(t_N^l, t_N^h)$ using a uniform random sampling $D(t_N^l, t_N^h)$ based on the output of the random number generator in the timing jitter 324. The CAN controller 312 generates each jitter time offset value uniformly and independently of any previously generated jitter offset value (e.g. for jitter offset values $j_0, j_1$, and $j_2$, the random generation of $j_1$ is not influenced by the value of $j_0$, the random generation of $j_2$ is not influenced by the value $j_0$ or $j_1$, etc.).

During the process 400, both of the nodes 304 and 306 use a predetermined jitter range to adjust the transmission times of each bit of data in a randomized manner to reduce the ability of the adversary 124 to perform timing side-channel attacks. The two nodes 304 and 306 generate jitter delays in transmitting bits in an overlapping time range in which the adversary node 124 is never able to determine which node transmitted each received bit with a high probability of certainty. Using the randomly selected jitter time offset values in the nodes 304 and 306 is most effective when the adversary node 124 is located at a position on the CAN bus that is between the nodes 304 and 306 as is depicted in the configuration of FIG. 3.

In another bus configuration, however, the position of the adversary relative to the nodes 304 and 306 potentially reduces the effectiveness of the random jitter. For example, as depicted in FIG. 5 the adversary node 124 is relocated to be at one end of the bus that is substantially closer to the node 304 and the adversary node 124 is also at a greater distance from the second node 306, which means that any propagated signal from node 2 will always take more than the inter-node propagation delay $t_{12}$ to arrive at the adversary while the signals from node 304 have a much shorter path to the adversary 124. In the configuration of FIG. 5, even with random time jitter offsets the adversary 124 can use a probabilistic inference to assume that the signal that arrives first is from the node 304 with a greater than 50% probability of being correct due to the comparatively large propagation offset from the second node 306. In this scenario, the CAN controller 312 in the node 304 uses the estimated propagation delay output $\hat{t}_{12}$ as a time offset that is added to the minimum jitter delay and maximum time value range to effectively add the estimated propagation delay to each randomly generated jitter value: $(t_N^l+\hat{t}_{12}, t_N^h+\hat{t}_{12})$ while the node 306 continues to use the default jitter time range $(t_N^l, t_N^h)$. This constant time offset to the jitter time interval for the node that is closest to the adversary once again reduces the effectiveness of the timing side-channel attacks that can be performed by the adversary. If the adversary 124 relocates to the region $R_3$ in FIG. 5 that is substantially closer to the node 306, then the node 306 uses the estimate of the propagation delay $\hat{t}_{12}$ as a constant offset to the selected jitter values to reduce the effectiveness of an adversary node that is located in the region $R_3$.

As depicted above in FIG. 3 and FIG. 5, the position of the adversary in the CAN bus can affect the manner of operation of the nodes 304 and 306 to generate jitter time offsets that affect the precise transmission times of bits when the two nodes 304 and 306 transmit bits simultaneously to perform cryptographic key exchange. Of course, a sophisticated adversary node can potentially be located at a wide range of position along the CAN bus. However, in many practical CAN bus embodiments the adversary node 124 has a high probability of being connected to the CAN bus at one or a small number of fixed locations where a particular CAN bus provides sockets for additional nodes to be connected to the CAN bus. For example, the onboard diagnostics II (OBD-II) port used in most commercial automobiles enable external devices to connect to the CAN bus in the vehicle at a fixed location within each vehicle. Consequently, the most likely location of an adversary is at the location of the OBD-II port, and the CAN controllers within the nodes of the CAN bus can be specifically configured to transmit bits with randomized jitter time offset with greatest effectiveness for an adversary that is located at the OBD-II port or other fixed connection location.

During the process 400, the transmitting nodes 304 and 306 use randomly generated jitter values to adjust the time of transmission in a random manner for each simultaneously transmitted bit in a series of transmitted bits to perform the cryptographic key exchange process. For example, the node 304 starts transmission of bits in a sequence at predetermined transmission times $[t_0, t_1, t_2, \ldots]$ that are separated by fixed time intervals based on the rate of bit transmission from the transceiver 316. The CAN controller 312 adds the randomly generated jitter time offset values $[j_0, j_1, j_2, \ldots]$ to each of the predetermined transmission times $[t_0+j_0, t_1+j_1, t_2+j_2, \ldots]$ to enable the node 304 to transmit with randomized jitter offset times. The nodes 304 and 306 only need to introduce the jitter into the transmission of the bits during the cryptographic key exchange process and return to normal transmission without the addition of jitter after the cryptographic key exchange process is completed.

The embodiments described above in the process 400 describe operations of the nodes that directly participate in the cryptographic key exchange process to reduce or eliminate the ability of the adversary node to perform timing side-channel attacks. Additionally, in some embodiments other nodes in the CAN bus system that are not directly participating in the cryptographic key exchange process perform operations to reduce the ability of the adversary node to perform the timing side-channel attacks. These nodes are referred to as "cooperative" nodes since they cooperate with the two participant nodes to reduce the effectiveness of the timing side-channel attacks. In one configuration, a non-participating node in the CAN bus system detects a dominant transmission during the cryptographic key exchange process and aids the original (unknown) transmitter by also transmitting a dominant bit. For group key scenarios in which groups of nodes share a cryptographic key by a pair-wise key exchange process, certain nodes (active observers) are aware of the bit that will be transmitted, since these nodes have already received a cryptographic key. These nodes can start transmission of the dominant bit at a predetermined time corresponding to the expected time for one of the participating nodes to transmit a dominant bit without observing the bus to further obfuscate the timing of the signal that is transmitted from the participating node that transmits the dominant bit. The operation of the non-participating nodes to transmit the dominant bits this has the effect of randomly elongating the bit duration and transition edges, thus obfuscating the adversary observations.

In addition to having non-participating nodes transmit dominant bits during the process 400, one or more additional non-participating nodes includes a variable impedance circuit that is connected to the CAN bus. At least one non-participating node operates the variable impedance device to introduce random changes to load resistance that affects the impedance level of the entire CAN bus while the two participating nodes transmit data during the cryptographic key exchange process. The can cause spurious transitions of the voltage level in the transmitted signals, which can mask the residual leakage due to cooperative transceivers.

The embodiments described herein describe methods for timing side-channel attacks against devices that transmit simultaneously using a shared communication medium such as CAN Bus in which the adversary can identify which node transmits a bit of data. The embodiments also describe systems and methods that reduce or eliminate the effectiveness of these attacks. These embodiments protect against adversaries that can physically probe the voltage characteristics of communication medium using high resolution equipment. Examples of systems that can use these methods include, but are not limited to, automotive systems (cars, buses, trucks, farm equipment, trains), industrial systems that use CAN bus, control panels for DC-electrical power distribution systems, and security systems that use CAN bus. The embodiments described herein introduce random jitter time offsets to the bit transmission time by the nodes to obfuscate timing measurements of signals that are observed by the adversary. A second embodiment utilizes multiple transmitters and receivers on the bus to elongate bit duration and obfuscate adversarial observations. Another embodiment enhances the second architecture by hiding multiple transmitters by introducing spurious transitions. This is achieved by defining an architecture that allows variation of network impedance.

It will be appreciated that variants of the above-disclosed and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following claims.

What is claimed:

1. A method for operation of at least one node in a communication network comprising:
    generating, with a first controller in a first node, a first jitter time offset randomly generated from within a predetermined time range;
    generating, with a second controller in a second node, a second jitter time offset randomly generated from within the predetermined time range;
    transmitting, with a first transceiver in the first node, a first data bit through an output of the first transceiver that is connected to a shared communication medium, the first data bit being transmitted at a first time corresponding to the first jitter time offset added to a first predetermined transmission time; and
    transmitting, with a second transceiver in the second node, a second data bit through an output of the second transceiver that is connected to the shared communication medium, the second data bit being transmitted at a second time corresponding to the second jitter time offset added to the first predetermined transmission time,
    wherein the first data bit and the second data bit are transmitted on the shared communication medium at least partially simultaneously.

2. The method of claim 1 further comprising:
    generating, with the first controller in the first node, a third jitter time offset randomly generated from within the predetermined time range independently from the first jitter time offset;
    generating, with the second controller in the second node, a fourth jitter time offset randomly generated from within the predetermined time range independently from the second jitter time offset;
    transmitting, with the first transceiver in the first node, a third data bit through the output of the first transceiver, the third data bit being transmitted at a third time corresponding to the third jitter time offset added to a second predetermined transmission time; and
    transmitting, with the second transceiver in the second node, a fourth data bit through the output of the second transceiver, the fourth data bit being transmitted at a fourth time corresponding to the fourth jitter time offset added to the second predetermined transmission time,
    wherein the third data bit and the fourth data bit are transmitted on the shared communication medium at least partially simultaneously.

3. The method of claim 1, wherein the shared communication medium is a controller area network (CAN) bus.

4. The method of claim 1 further comprising:
    transmitting, with the first transceiver in the first node, a first data frame through the shared communication medium to the second node connected to the shared communication medium;
    receiving, with the first transceiver in the first node, a second data frame from the second node in response to the first data frame;
    identifying, with the first controller in the first node, an estimated propagation delay time for signals transmitted between the first node and the second node, the propagation delay time corresponding to one half of an elapsed time from an end of transmission of the first data frame and a beginning of reception of the second data frame; and
    generating, with the first controller in the first node, the predetermined time range with a minimum time value and a maximum time value based on the estimated propagation delay time prior to transmitting the first data bit.

5. The method of claim 4 further comprising:
    generating, with the first controller in the first node, the predetermined time range with the maximum time value based on the estimated propagation delay time multiplied by a predetermined value that is greater than 1 and less than 2 prior to transmitting the first data bit.

6. The method of claim 4 further comprising:
    adding, with the first controller in the first node, the estimated propagation delay time to the minimum time value in the predetermined time range and the maximum time value in the predetermined time range to offset the predetermined time range by the estimated propagation delay time.

7. The method of claim 1, wherein the transmitting of the first data bit from the first node at the first time and the second data bit from the second node at the second time prevents an adversary node that is connected to the shared communication medium from determining that the first node transmitted the first bit and the second node transmitted the second bit through the shared communication medium.

8. The method of claim 7 further comprising:
    detecting, with a third transceiver in a third node connected to the shared communication medium, the transmission of one of the first bit from the first node and the second bit from the second node; and
    transmitting, with the third transceiver in the third node a dominant bit through the shared communication medium during the transmission of the first data bit from the first node and the second data bit from the second node to elongate a transmission time of the dominant bit through the shared communication medium and prevent the adversary node that is connected to the shared communication medium from determining that the first node transmitted the first bit and the second node transmitted the second bit through the shared communication medium.

9. The method of claim 7 further comprising:
    transmitting, with a third transceiver in a third node connected to the shared communication medium, a dominant bit through the shared communication medium at a predetermined time corresponding to the transmission of the first data bit from the first node and the second data bit from the second node to elongate a transmission time of the dominant bit through the shared communication medium and prevent the adversary node that is connected to the shared communication medium from determining that the first node transmitted the first bit and the second node transmitted the second bit through the shared communication medium.

* * * * *